United States Patent [19]

Pratt et al.

[11] Patent Number: 4,595,145

[45] Date of Patent: * Jun. 17, 1986

[54] AIR DISTRIBUTION APPARATUS FOR A FLUID CATALYTIC CRACKING CATALYST REGENERATOR

[75] Inventors: Roy E. Pratt, Port Neches; Thomas A. Lionetti, Houston; John P. MacLean, Stafford, all of Tex.

[73] Assignee: Texaco Inc., White Plains, N.Y.

[*] Notice: The portion of the term of this patent subsequent to Apr. 17, 2001 has been disclaimed.

[21] Appl. No.: 655,802

[22] Filed: Oct. 1, 1984

[51] Int. Cl.⁴ .......................... B05B 1/14; B01J 29/38
[52] U.S. Cl. .................................... 239/558; 239/567
[58] Field of Search ............... 239/559, 560, 567, 558, 239/548

[56] References Cited

U.S. PATENT DOCUMENTS

| | | | |
|---|---|---|---|
| 2,992,781 | 7/1961 | Howard, Sr. | 239/567 X |
| 4,032,300 | 6/1977 | Parker et al. | 239/558 X |
| 4,443,551 | 4/1984 | Lionetti et al. | 239/558 X |

Primary Examiner—Joseph F. Peters, Jr.
Assistant Examiner—L. E. Williams
Attorney, Agent, or Firm—Jack H. Park; Kenneth R. Priem; Richard A. Morgan

[57] ABSTRACT

An improved air distribution apparatus for a regenerator in a fluid catalytic cracking process has been invented. The improvement is in the nozzles which eject air from an air ring to a bed of coke deactivated catalyst. The nozzles are positioned to take air from the centerline of the air ring and are of length 4 to 8 diameters. The nozzles are noted for reduced aspirated catalyst erosion.

5 Claims, 4 Drawing Figures

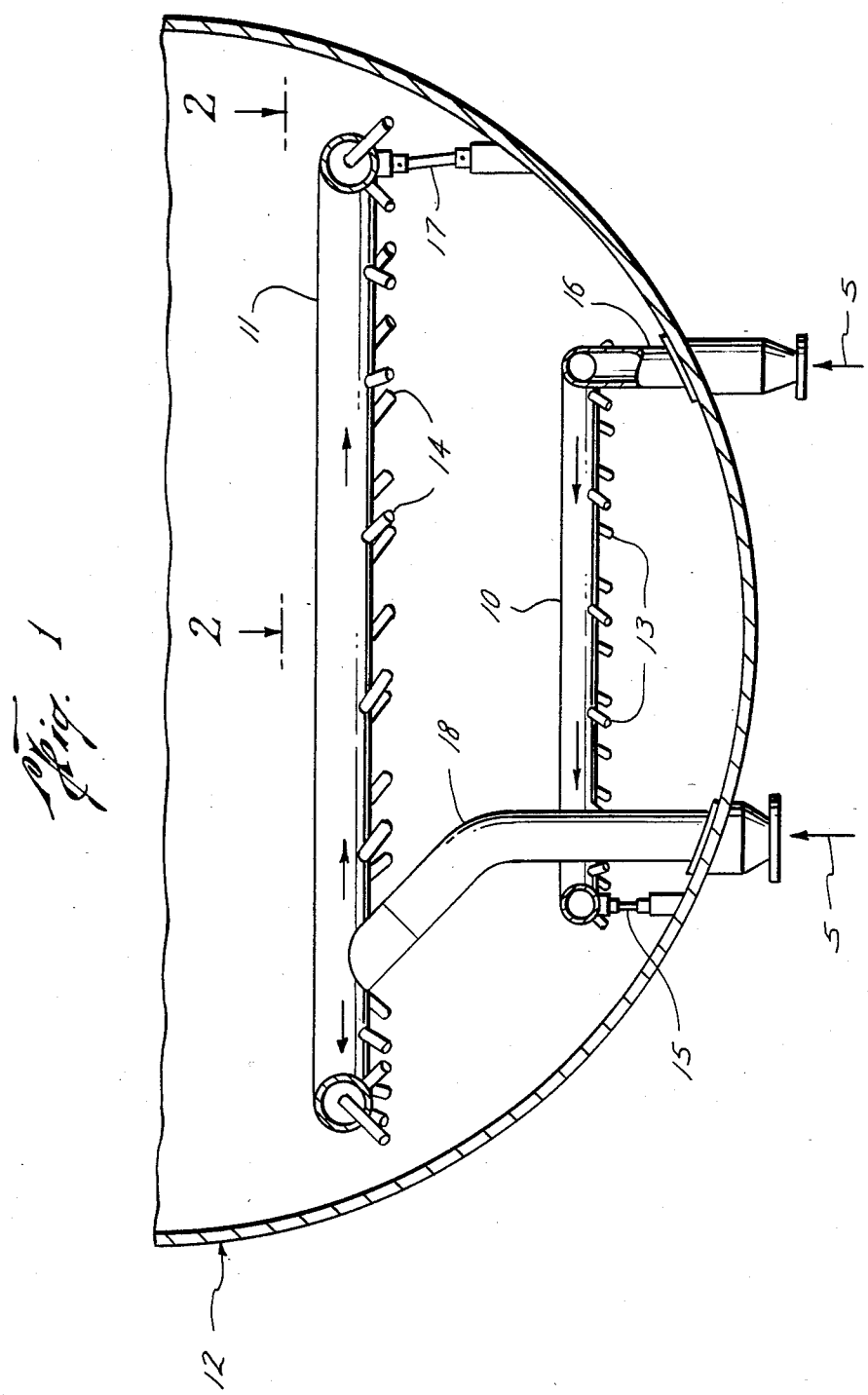

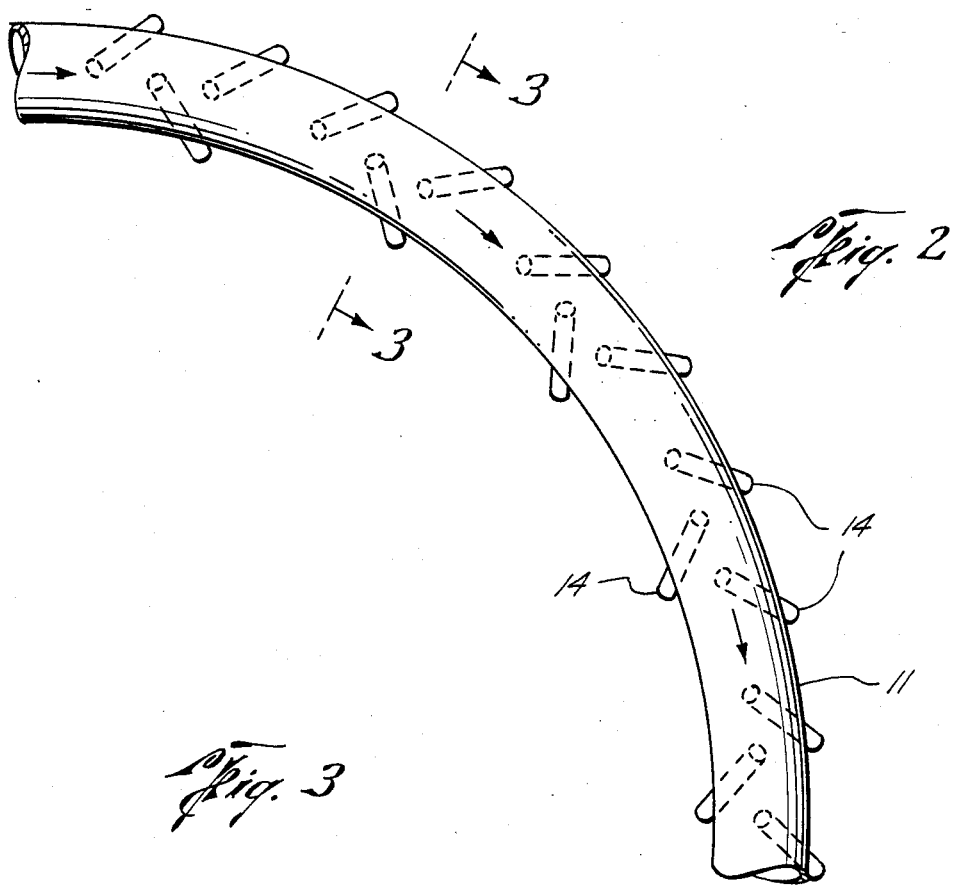
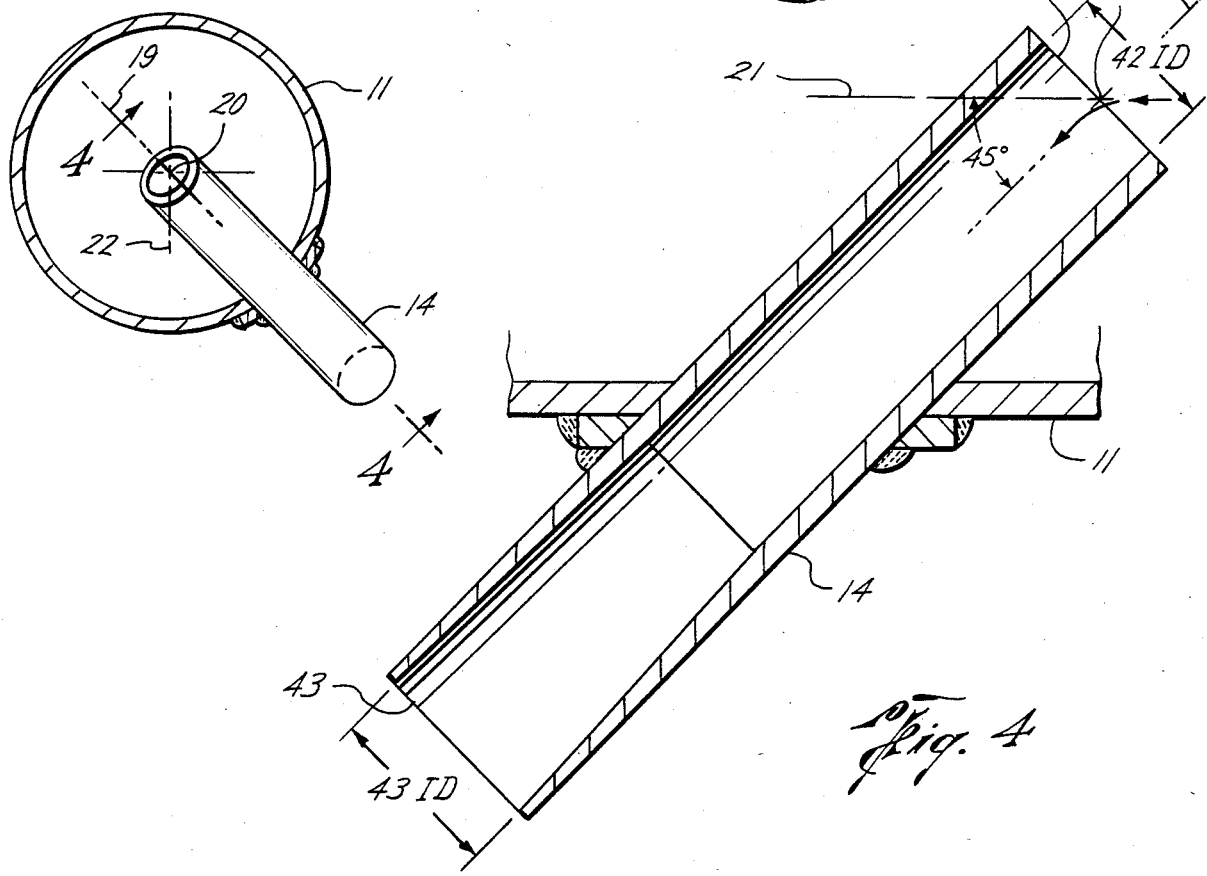

AIR DISTRIBUTION APPARATUS FOR A FLUID CATALYTIC CRACKING CATALYST REGENERATOR

BACKGROUND OF THE INVENTION

1. Field of the Invention

This invention is an improvement in the air distribution apparatus in the catalyst regenerator of a fluid catalytic cracking process. More specifically, the invention is an improvement in the nozzles which eject air from an air ring to a bed of coke deactivated catalyst. The invention is distinguished in reducing catalyst erosion in the nozzles.

2. Description of the Prior Art

The present invention is an improvement in the regeneration of catalyst used in a fluid catalytic cracking process such as the process described in U.S. Pat. No. 3,433,733. In a fluid catalytic cracking process, a hydrocarbon is contacted with a fluidized solid catalyst within a reaction zone to effect conversion of at least a portion of the hydrocarbon to cracked products. One cracked product is coke which deposits on the outer surface of the catalyst, reversibly deactivating it. Catalyst within an outer layer of coke is continuously removed from the reaction zone and stripped of light hydrocarbon. Stripped catalyst is then passed to the dense phase of the regeneration zone. In this zone, coke deactivated catalyst is contacted with an oxygen-carrying gas, typically air, to effect combustion of at least a portion of the deposited coke, thereby regenerating the catalyst.

Regenerated catalyst is continuously withdrawn from the regeneration zone and introduced to the reaction zone. To prompt an efficient regeneration, an even distribution of regeneration air is introduced into the lower portion of the dense phase of the regeneration zone. The efficiency of the regeneration process is dependent on the specific distribution of air through the spent catalyst zone. It has been found desirable to distribute the air outwardly from the air distributor at sufficient pressure differentials to cause the air to effectively distribute through the zone of spent catalyst. It has been found that the volume of air leaving the air distributor nozzles may be so unbalanced or unsteady between nozzles in the distributor at such desired pressure levels that turbulent eddies draw catalyst into the nozzles thereby effecting erosion. The basis for this theory of unsteady state air distribution among nozzles and aspiration of catalyst is the finding of eroded nozzles and also nozzles which have become plugged with catalyst. When a nozzle becomes plugged, air becomes maldistributed in the regenerator and regeneration efficiency decreases. Too, air velocity is increased through the unplugged nozzles enhancing turbulent flow and exacerbating catalyst aspiration, catalyst attrition and nozzle erosion.

There is a need in the art of fluid catalytic cracking catalyst regeneration for an air distribution apparatus which experiences reduced catalyst erosion in the nozzles. U.S. Pat. Nos. 4,223,843 and 4,443,551 are advances in the art of fluid catalytic cracking catalyst regeneration.

BRIEF DESCRIPTION OF THE DRAWINGS

The drawing illustrates in several views a schematic representation of the present invention.

FIG. 1 is a schematic diagrammatic vertical sectional view of a portion of the air distributor in the form of an air ring with the nozzles mounted at a 45° angle to the flow of air in the air ring.

FIG. 2 is a schematic diagrammatic horizontal sectional view of a portion of the air ring and nozzle combination taken at 2—2 on FIG. 1.

FIG. 3 is a section taken at 3—3 on FIG. 2.

FIG. 4 is a section taken at 4—4 on FIG. 3.

DETAILED DESCRIPTION OF THE DRAWINGS

While various devices may be utilized for carrying out or practicing the above inventive methods, FIGS. 1-4 illustrate at least one inventive apparatus for practicing the methods described above.

FIG. 1 shows the new distributors 10 and 11 for use in a regenerator 12 with nozzles 13 and 14, respectively, therein protruding from the air ring at a 45° angle to the flow of air in the air ring. While circular ring shaped air distributors are shown for illustration, a non circular type may be utilized if so desired or required.

In the regenerator 12 of FIG. 1, inner air distribution ring 10 mounted therein on a plurality of struts, as strut 15 illustrated, and with high velocity air 5 through duct 16 mounted radially on the air ring 10 and supplied from air supply means (not shown) for passing the high pressure air to the air distribution ring 10 for being distributed around the bottom in the regenerator through the nozzles 13 for maintaining the catalyst fluidized in a fluidized bed.

Upper and outer air distribution ring 11 is likewise supported from the bottom of the regenerator with struts, such as with the illustrated strut 17 and connected to a high pressure air supply duct 18. Angled nozzles 14 are likewise mounted on outer air ring 11 at a 45° angle to the flow of air through the ring whereby the high pressure high velocity air makes a 45° angle change of direction prior to being ejected into the catalyst fluidized bed.

While the gas described in the enclosed example is air, obviously other gases may be utilized for being ejected by the nozzles.

FIG. 2, a section taken at 2—2 on FIG. 1, illustrates the position of the nozzles 14 on air supply ring 11 being between 30° and 75° and preferably between 45° and 60° from the direction of flow at the nozzle entrance so that the fluid flow is deviated 45°, for example, from the flow path in the ring 11. The result is decreased erosion in the nozzles by the catalyst drawn up from the regenerator and less tendency of aspirating catalyst up the nozzle.

FIG. 3, a section at 3—3 on FIG. 2 illustrates a nozzle 14 protruding from air ring 11 at 45° from a vertical plane through the air supply ring axis. This angle may vary, depending on the particular air pressure and design requirements, but the nozzle should lie in a plane through the central axis of the column of supply air at the nozzle, deviated from the central axis at an angle between 30° and 75°, and preferably between 45° and 60°. It should further extend to the point 20 defining the geometric center of the air ring 11 cross section.

FIG. 4, a section of 4—4 on FIG. 3 illustrates the angle between a nozzle 14 on air ring 11 and the flow of supply air in the air ring at the nozzle or the angle between the central axis 19 of the nozzle 14 and the point 20 defining the geometric center of the section 3—3 and the locus of points 20 defining a centerline 21 of the air ring.

Each nozzle has a nozzle bore entrance 42 of an entrance diameter 42ID and a nozzle bore exit 43 of an exit diameter 43ID. The entrance diameter 42ID may equal the exit diameter 43ID in which case the bore is not tapered. The entrance diameter 42ID may be less that the exit diameter 43ID such that the bore tapers outwardly or diverges from the nozzle entrance 42 toward the exit. The half angle of such taper may be almost up to but less than 7°, but preferably between 1° and 3.5°. The length of the nozzle, as well as the angle of taper, will vary within herein defined ranges according to application.

SUMMARY OF THE INVENTION

The invention is an improved air distributor apparatus for delivering a high velocity oxygen-carrying gas such as air to a zone of spent catalyst in a fluid catalytic cracking process. The air distributor comprises a horizontally positioned air ring into which is positioned a plurality of downward directed nozzles.

An air supply means supplies high velocity oxygen-carrying gas such as air to the air ring. The air ring contains a bore through which high velocity oxygen-carrying gas is flowed to a plurality of nozzles. At each point on the air ring, a vertical cross section contains a geometric center of the air ring. The locus of these geometric centers defines a center line of the air ring.

Each nozzle of the plurality of nozzles extends from within the air ring bore to within the zone of spent catalyst. The nozzles contain a nozzle bore of an inside diameter. High velocity oxygen-carrying gas is flowed through the bore and delivered to the zone of spent catalyst.

In the air distributor apparatus, the improvement comprises extending the nozzle from approximately the center line of the air ring to within the zone of spent catalyst. The improvement further comprises extending each nozzle for a length of at least 4 and not more than 8 nozzle inside diameters. Preferably, nozzle length is 4 to 6 nozzle inside diameters.

This improvement decreases turbulent flow in the nozzle. The decrease in turbulent flow decreases the erosion in the nozzle due to catalyst drawn up from the catalyst in the regenerator.

DESCRIPTION OF THE PREFERRED EMBODIMENTS

A new apparatus has been invented for delivering a high velocity oxygen-carrying gas from an air distributor to a zone of spent catalyst in a regenerator in a fluid catalytic cracking process. The apparatus is distinguished by decreased nozzle erosion from catalyst aspirated into the nozzles due to turbulent flow including pulsations through the nozzle, particularly at the nozzle exit.

The turbulent flow is reduced by two means. The first is by extending the nozzle inside the air ring to approximately the centerline. At the centerline is found the least resistance to air flow and correspondingly the least variation in air velocity. Variation in velocity causes maldistribution in the air ring and hence pulsations. Pulsations cause aspiration of catalyst into the nozzles and then ejection, eroding the nozzles. At the locus of points defining the centerline is found the least variation in flow unaffected by wall effects including eddies and resistance to flow. This is the best supply point for air.

In the second means for reducing turbulence, the nozzles are extended from the centerline to the dense phase catalyst zone for a total length of from 4 to 8 preferably 4 to 6 nozzle inside diameters. In the case of tapered nozzles, the diameter is the greatest nozzle diameter. This length provides a head of air preventing back flow or aspiration through a short time pressure swing (pulsation) around the ring. The flow of air is diffused through the catalyst zone rather than aspirated with catalyst back into the nozzle.

It has also been found that tapering the bore of the nozzle so that the nozzle bore diverges with the gas flow improves performance. The taper reduces the tendency of the nozzle to hold catalyst and thereby plug. Nozzle plugging increases air velocity through the remaining open nozzles and causes more turbulent flow, exacerbating erosion due to turbulence. When all the nozzles are open and discharging air, distribution around the ring and to all the nozzles is optimal and the tendency for pulsations causing catalyst aspiration reduced.

By limiting the taper of the nozzle to less than a half angle of 7°, the instant invention avoids boundary layer separation in the nozzle. Thus, pressure losses in the taper of the nozzle are limited to frictional losses at the wall which are offset to some extent by the pressure regained due to the deaccelerative effect of the increasing cross-sectional area as the nozzle diverges. If boundary layer separation did occur in the nozzles because of use of a high angle of taper (greater than 7° half angle), the resulting pressure loss could cause the need for a bigger air supply blower. Also, boundary layer separation could cause catalyst scouring of the nozzle walls resulting in wall erosion and catalyst attrition. The subject invention avoids the possibility of boundary layer separation by limiting nozzle taper to less than a half angle of 7°. U.S. Pat. No. 4,223,843 discusses this phenomenon more thoroughly and is incorporated herein in its entirety by reference.

Further, should aspiration occur, tapering causes the nozzle outlet velocity to be lower for a given pressure drop. Thus though erosion will occur, it will be reduced at the nozzle outlet where the most severe metal loss is found.

It has also been found, as taught by U.S. Pat. No. 4,443,551 incorporated herein in its entirety by reference that a 30° to 75°, optimally 45° to 60° diverted flow design also makes the nozzle self-clearing as does tapering. The best results are achieved by directing the air downward and through an angle in the range of 30° to 75° to the flow of air in the air distributor. This deflection together with a downward deflection of 30° to 75° gives best results. It has been found that a double deflection of 45° when incorporated into the instant apparatus produces the best results for nozzle clearing and reduced catalyst erosion.

What is claimed is:

1. An improved air distributor apparatus for delivering a high velocity oxygen-carrying gas such as air to a zone of spent catalyst in a regenerator in a fluid catalytic cracking process comprising:
   (a) horizontally positioned air ring containing an air ring bore through which high velocity oxygen-carrying gas is flowed to a plurality of nozzles; a vertical cross section of the air ring containing a geometric center of the air ring, a locus of geometric centers defining a centerline of the air ring, (b) the plurality of nozzles (i) each nozzle of a length extending from within the air ring bore to within the zone of spent catalyst, (ii) each nozzle containing a nozzle bore of an inside diameter to allow flow of high velocity oxygen-carrying gas from the air ring bore to the zone of spent catalyst; (iii) each nozzle positioned to direct the gas downward;

wherein the improvement comprises:

(iv) each nozzle extending from approximately the centerline of the air ring to the zone of spent catalyst; and (v) each nozzle of length at least 4 and not more than 8 nozzle inside diameters.

2. The apparatus of claim 1 wherein the nozzles are positioned to deflect the oxygen carrying gas from the air ring through an angle in the range of 30° to 75° to the flow of air in the distributor.

3. The apparatus of claim 2 wherein the nozzles are positioned to deflect the oxygen carrying gas downward 30° to 75° from the horizontal.

4. The apparatus of claim 1 wherein the nozzle bore diverges with the gas flow at a half angle less than 7° thereby reducing catalyst plugging and wherein (b) (ii) the inside diameter is the maximum inside diameter.

5. The apparatus of claim 1 wherein the nozzle length is 4 to 6 nozzle inside diameters.

* * * * *